Aug. 15, 1961 W. M. CUTLER 2,995,767
ROUGHENING MACHINE
Filed July 28, 1958 7 Sheets-Sheet 1

Fig. 1.

INVENTOR.
Wallace M. Cutler
BY Harold E. Cole
Attorney

Aug. 15, 1961  W. M. CUTLER  2,995,767
ROUGHENING MACHINE

Filed July 28, 1958  7 Sheets—Sheet 3

Fig. 3.

Inventor
Wallace M. Cutler
By Harold E. Cole
Attorney

Aug. 15, 1961   W. M. CUTLER   2,995,767
ROUGHENING MACHINE

Filed July 28, 1958   7 Sheets-Sheet 5

INVENTOR.
Wallace M. Cutler
BY Harold E. Cole
Attorney

Aug. 15, 1961  W. M. CUTLER  2,995,767
ROUGHENING MACHINE
Filed July 28, 1958  7 Sheets-Sheet 7

INVENTOR.
Wallace M. Cutler
BY Harold E. Cole
Attorney

United States Patent Office 2,995,767
Patented Aug. 15, 1961

2,995,767
ROUGHENING MACHINE
Wallace M. Cutler, Gloucester, Mass., assignor to Oliver C. Eckel, Carlisle, Mass.
Filed July 28, 1958, Ser. No. 751,570
11 Claims. (Cl. 15—303)

This invention relates to a roughening machine, especially one for preparing the surface of a rubber sheet for adhesion.

One object of my invention is to provide a roughening machine which will travel over a sheet of rubber and hold the latter flat, while a cutter cuts away the shiny surface of said sheet, thus preparing the latter so it can be adhesively and effectively united with another sheet of rubber or other article.

Another object is to provide such a machine with apparatus that permits a fine and ready adjustment so that the position of a sliding plate, that slides on the top of said sheet, can be adjusted relative to a cutter. This enables such a fine degree of adjustment that the distance the cutter penetrates into the surface of a sheet can be determined as minutely as desired.

Another object is to provide such a machine with a cutting assembly that is carried on a carriage, and that can be moved, while connected to said carriage, to a convenient position to thus make different parts thereof available for adjustment, replacement or repair.

A further object is to provide such a machine with mechanism whereby a simple movement will raise the sliding plate and cutter of the cutting assembly slightly above said sheet, whenever desired.

The foregoing and other objects which will appear as the nature of the invention is better understood, may be accomplished by a construction, combination and operative arrangement of such parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

As illustrated, a main support 1, shown as including a table 2, has two vertically extending side mounting plates 3 and 4 supported on said table at front and rear ends of my apparatus. Three long supporting rods 5, 6 and 7, spaced laterally apart, extend between and are mounted in said side plates 3 and 4, over which rods a carriage 12 runs, later described. Two wheels 8 are attached to said side plate 3, and two wheels 8a are attached to said side plate 4, the attachments being made by studs 8b. Said wheels 8 and 8a run on said table 2. Actuating means include two well-known sprocket-drive chains 9 and 10 that extend through openings in said mounting plates 3 and 4, being driven by well known mechanism, not shown. These chains serve to move said carriage 12, carrying a cutting or roughening assembly over a rubber sheet S or other work, lying on said table 2, which sheet is to be roughened by removing the smooth outer surface so an adhesive will stick thereto.

Said movable carriage 12 has three, right-angle base members 13, 14 and 15 directly above said supporting rods 5, 6 and 7 respectively. There is a cross bar 16 to which said chain 9 is attached, as by bolts, not shown, and a cross bar 18 to which said chain 10 is attached, as by welding. These cross bars 16 and 18 are welded to said base members 13, 14 and 15, and thus said carriage 12 is moved by actuation of said chains. Two upper roller mounting plates 21 and 22 spaced apart are welded to said base member 13, and two upper roller mounting plates 23 and 24 are welded to said base member 14. Two side roller mounting plates 25 and 26 are welded to said base member 13, and two side roller mounting plates 27 and 28 are welded to said base member 14. Each of said eight mounting plates carry a roller wheel 29, which wheels roll along the tops and sides of said carriage supporting rods 5 and 6. A roller mounting plate 30 is welded to the top of said base member 15, carrying a roller wheel 29 that rolls along the top of said rod 7.

Figure 5:
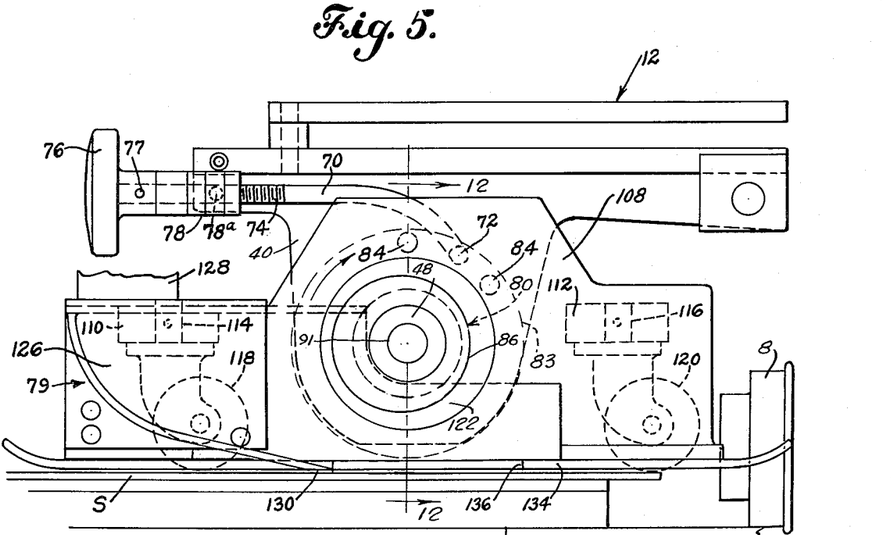
FIG. 5 is another partial left side elevational view, enlarged, showing the carriage for my machine and the eccentric adjusting mechanism supported thereby to adjust the cutting assembly, the latter not being shown.
Figure 6:
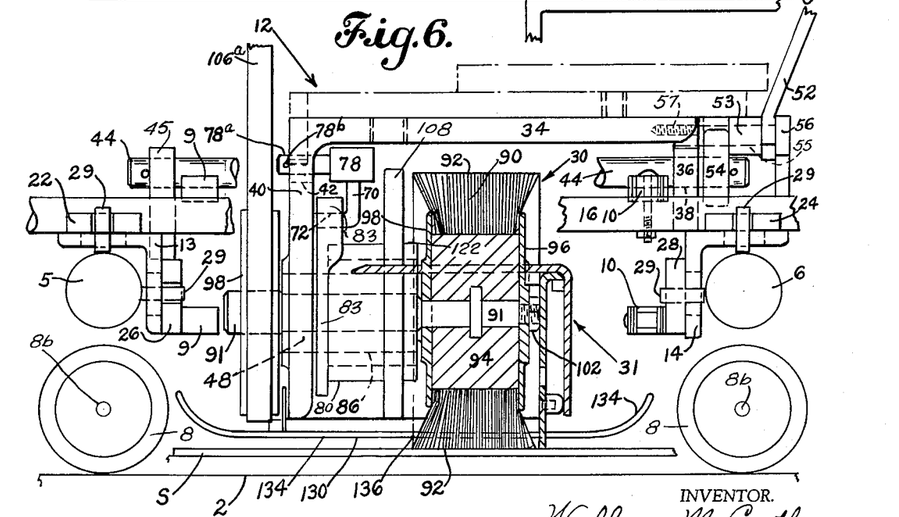
FIG. 6 is a partial rear elevational view, enlarged, showing the cutting assembly with the cutter shown in section.

A cutting assembly 31 carried by, and pivotally movable relative to said carriage 12 towards and away from said sheet S has an angle support or mounting having a top plate 34 from which a left side 36 depends, which latter has a hole 38 therethrough. It also has a right and wider side 40 that extends from an opposite part of said top plate 34 and has a hole 42 therethrough. A pivot rod 44 freely extends through said side holes 38 and 42, and through a bearing member 45 welded to said side mounting plate 26 and through another bearing member 46 welded to said side mounting plate 28. Thus said cutting assembly 31 pivotally moves near one end about said rod 44, whereby it can be moved to and away from the rubber sheet S lying on said table 2. A cylindrical bearing 48 extends from said angle support wider side 40 towards said base member 13, and is later described.

Figure 1:
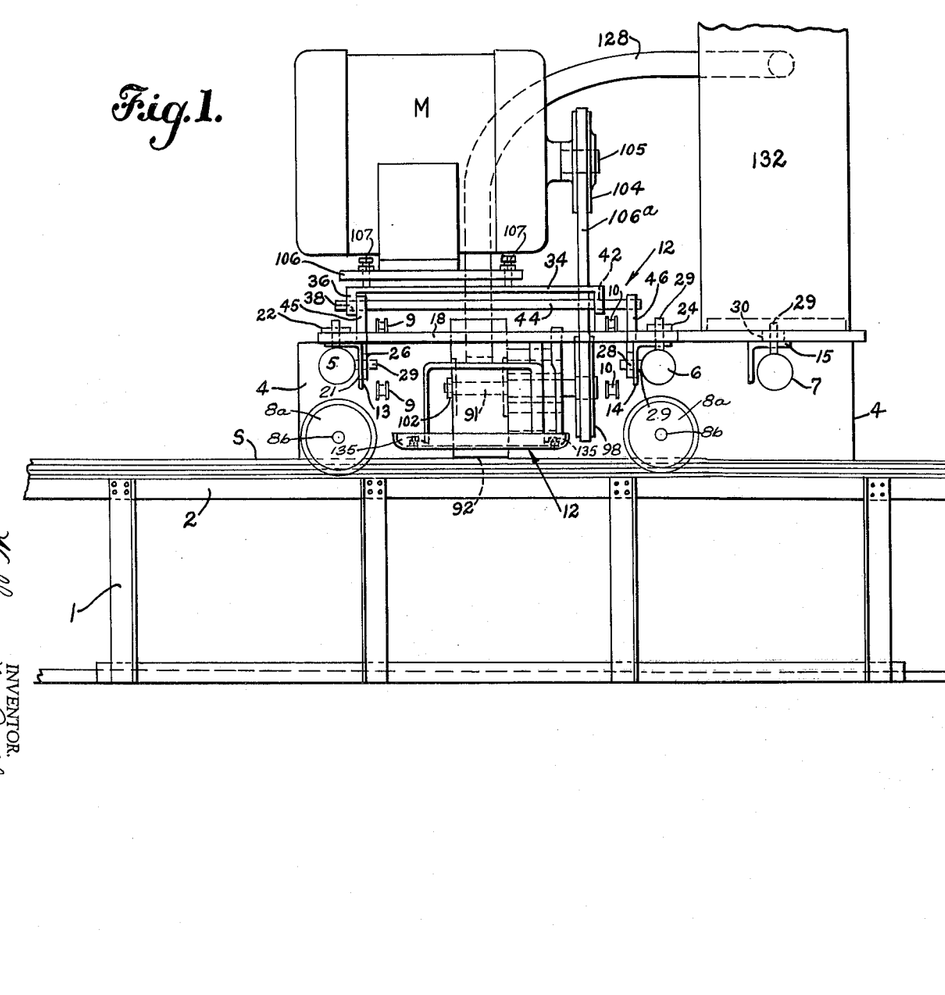
FIG. 1 is a front elevational view of my machine, with a front mounting plate removed.
Figures 2, 13:
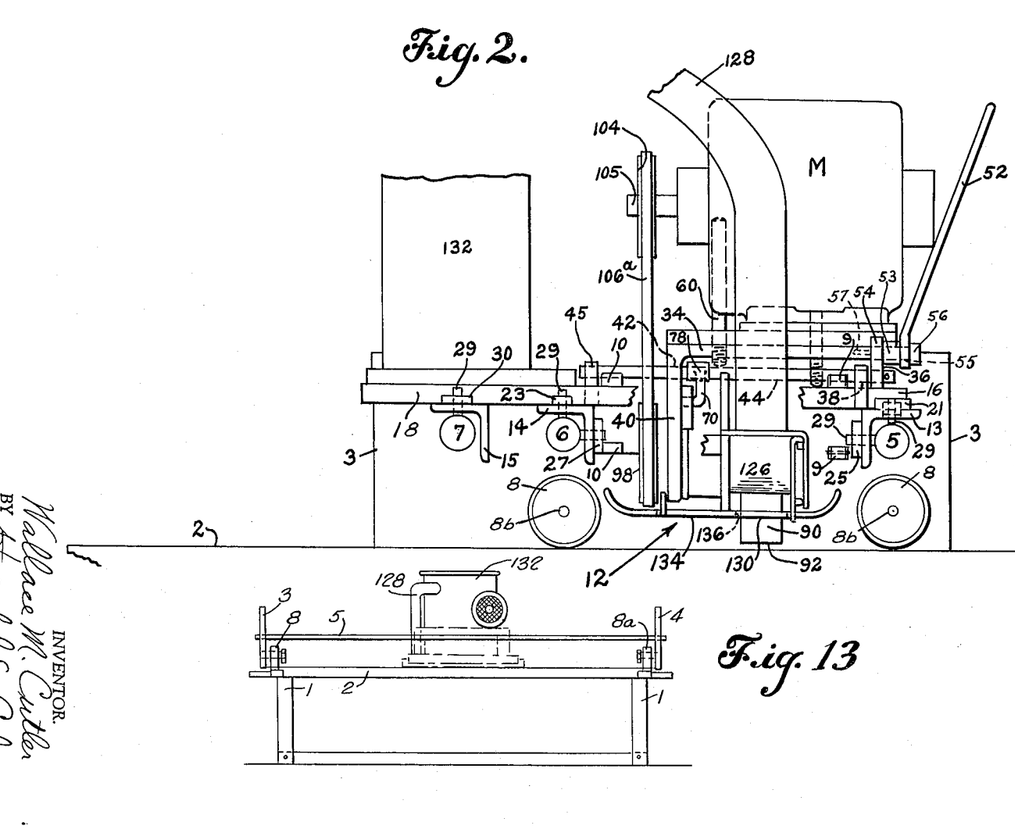
FIG. 2 is a rear elevational view of my machine, with a rear mounting plate removed.
FIG. 13 is a side elevational view, on a reduced scale, of my machine to show opposite side mounting plates with a supporting rod mounted thereon, and wheels attached to said side plates that run on a table, omitting other mechanism.
Figure 3:
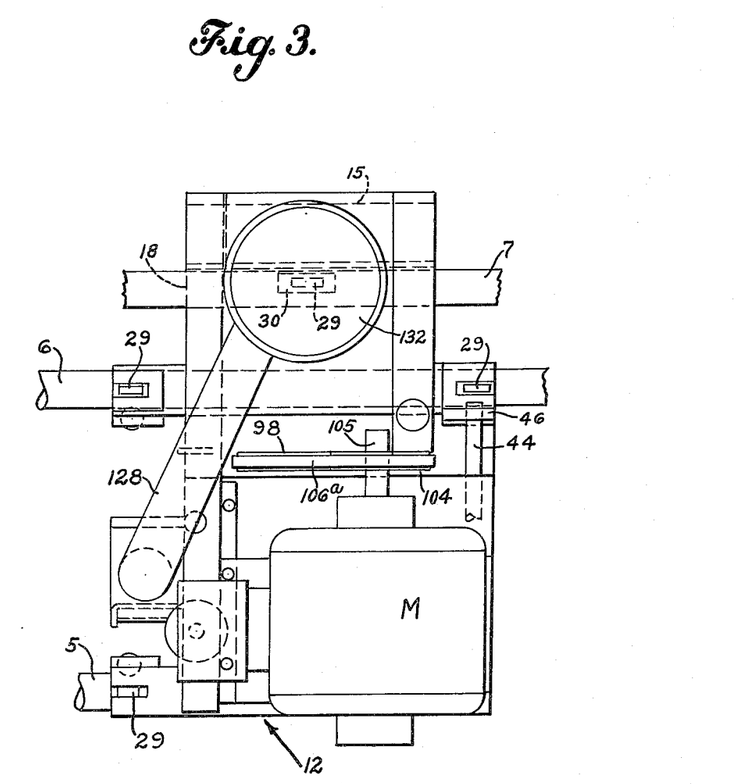
FIG. 3 is a top plan view of my machine, with the front and rear mounting plates omitted and the carriage supporting rods being shown broken away.
Figure 4:
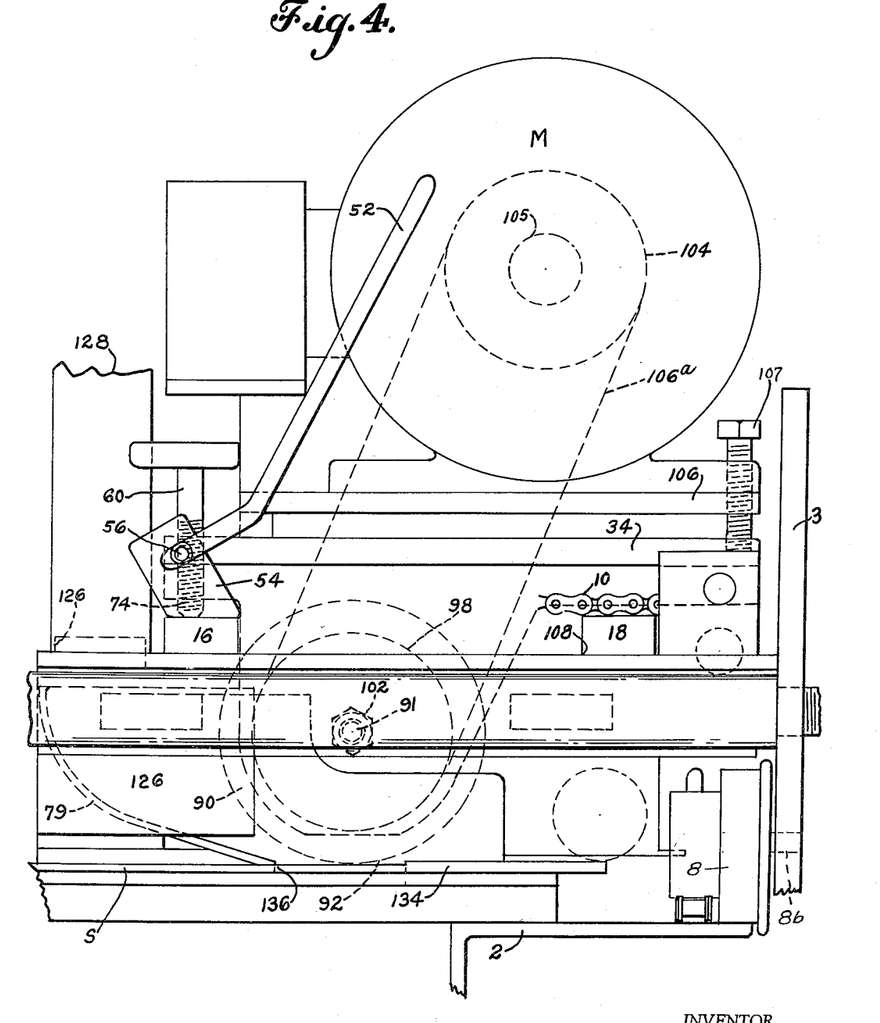
FIG. 4 is a partial left side elevational view, enlarged, the carriage supporting rods being shown broken away.

A movement of said cutting assembly either downwardly and towards, or upwardly and away from, said rubber sheet S is effected by means of a handle 52, a spacer 53, and a cam member 54 welded together which are rotatively held by a pin 55 having a head 56. Said pin 55 is screw-threaded as at 57 at one end and connects in a screw-threaded opening in said top plate 34. Said carriage cross bar 16 is directly under said cam member 54, hence rotative movement, in one direction, of the latter on said cross bar 16 lowers said cutting assembly to operative position on said rubber sheet S, while rotative movement in the opposite direction raises said assembly a short distance away from said sheet. This is made possible by pivotal movement of said cutting assembly 31 about said rod 44.

A stop screw 60 is connected to, and extends through and beyond said top plate 34 towards said carriage cross bar 16 keeping the latter spaced from said top plate 34 at all times, thus setting a limit to the movement of said cutting assembly downwardly to said sheet S. In operating position, a sliding plate 130, later described, contacts said sheet sufficiently to hold it flat during the roughening operation.

Figures 9, 10:
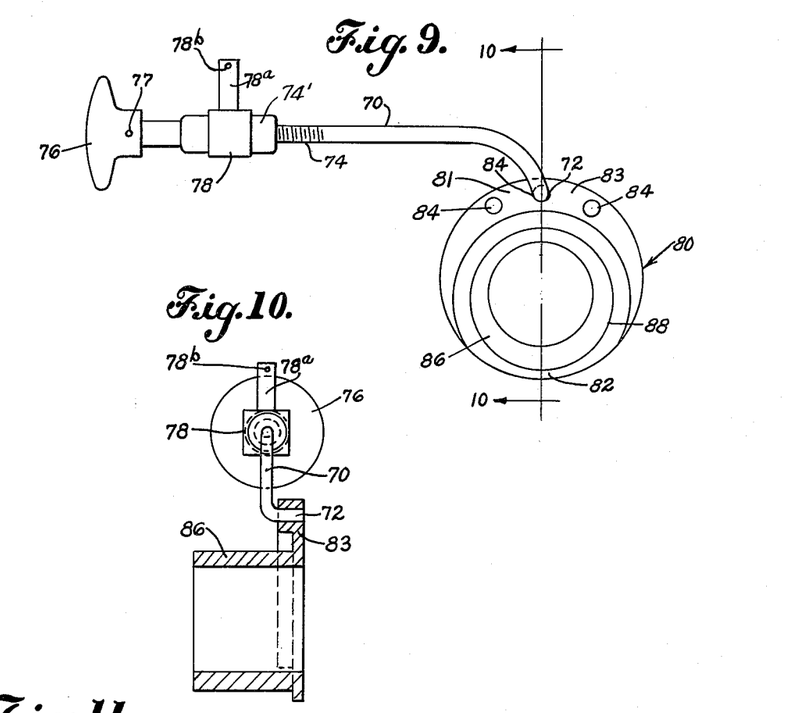
FIG. 9 is a side elevational view in detail of the adjusting screw and eccentric actuating member to adjust the depth of the cut made by the cutting member.
FIG. 10 is a sectional view taken on the line 10—10 of FIG. 9.

An adjusting screw 70, having an angular or finger end 72, has a screw-threaded portion 74 coupled to a threaded sleeve 74' on which a handle 76 is fixed by a pin 77. This screw-threaded portion 74 connects with the interiorly, screw-threaded sleeve 74' that is rotatably supported by a bearing 78 connected to said angle support wider side 40 by an extension 78a extending therethrough and held by a cotter pin 78b. Rotation of said handle 76 causes screw-threaded movement of said screw-threaded portion 74 relative to said bearing 78 thus causing said adjusting screw to change its position, as later explained.

Said cutting assembly 31 preferably has adjustable apparatus embodying a mounting member 79 upon which is mounted a hollow, eccentric actuating member 80 that has an eccentric atcuating end 81 having an arcuate, narrower portion 82 and a wider, arcuate portion 83. The latter has three positioning holes 84 therein near the periphery, into one of which holes said control screw finger end 72 extends. An eccentric sleeve portion 86 is integral with and extends laterally beyond said end portions 82 and 83, terminating in an end portion 88 of lesser diameter than said portions 82 and 83 at the opposite end of said sleeve 86. This sleeve portion 86 rotatively fits on said fixed bearing 48, and can be moved eccentrically about the latter, upon actuation of said screw 70, to thereby change the position of said sliding plate 130 relative to a well-known cutter 90 by movement of said mounting member 79.

Said cutter 90 is mounted independently of said adjustable apparatus, being fixedly mounted on a shaft 91, just beyond said eccentric sleeve portion 86, which cutter has many wire cutting bristles 92 that extend radially outwardly from a center core 94. Two circular retaining plates 96 and 98 are at opposite sides of said bristles 92, being fixed to said cutter, to keep said bristles from spreading laterally.

Outwardly of said cutter 90 and angle support side 40 is a pulley 98, and said shaft 91 is fixed to and rotatably extends from this pulley through said angle support side 40 and eccentric member 80 and beyond. Said shaft 91 is keyed to said center core 94, thus rotating said cutter 90. A nut 102 on said shaft 91 retains said core 94 in place. Another pulley 104 is driven by a shaft 105 of a motor M that rests on a plate 106 that is attached to said angle support top plate 34 by screws 107. A belt 106a, extending between said pulleys 98 and 104, serves to rotate said pulley 98 thus rotating said shaft 91.

Figure 7:
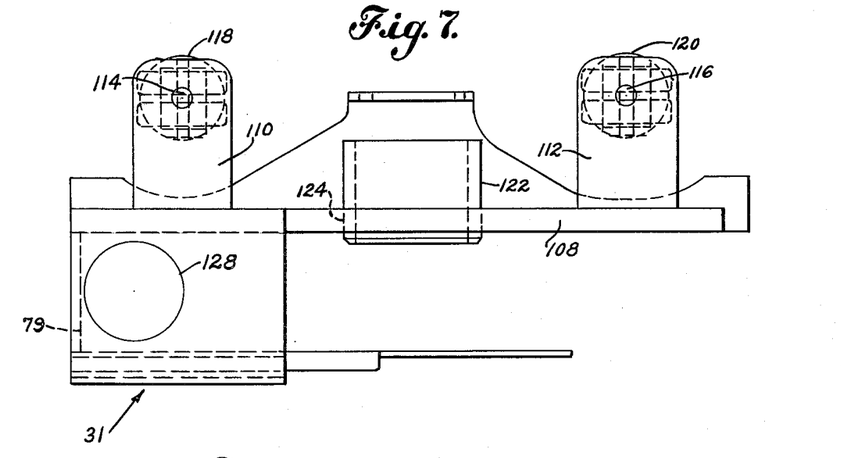
FIG. 7 is a top plan view of the side extension plate of the adjustable apparatus of my machine, and including caster wheels mounted thereon.
Figure 11:
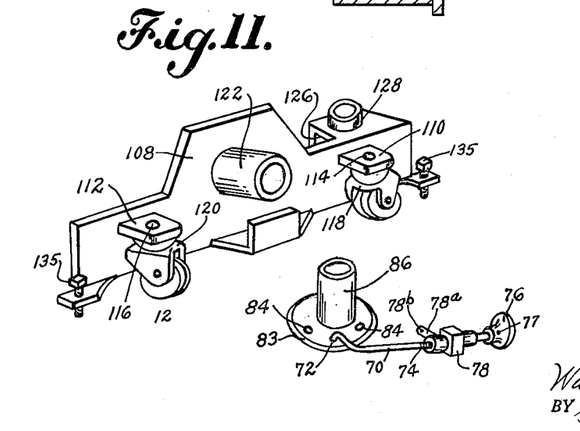
FIG. 11 is a perspective view, separately showing the adjustable apparatus mounting member, and the eccentric actuating member upon which this mounting member is rotatively mounted.
Figure 12:
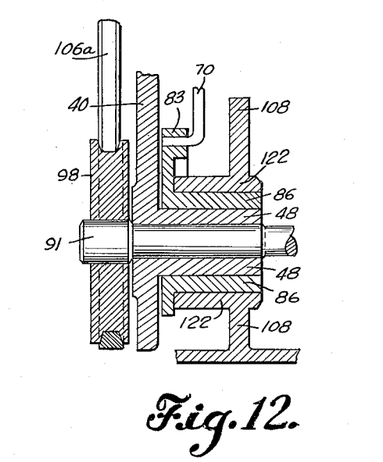
FIG. 12 is a sectional view taken on the line 12—12 of FIG. 5.

Said adjustable apparatus mounting member 79 includes a relatively large side extension plate 108 that extends both forwardly and rearwardly from said sleeve portion 86, and under said carriage bars 16 and 18. Two bosses 110 and 112 extend integrally from said side extension plate 108, and are under said carriage cross bars 16 and 18. Two caster shafts 114 and 116 loosely and movably fit in said bosses 110 and 112, and support caster wheels 118 and 120 which run upon the said sheet S on the top of said table 2 and provide the main support for said cutting assembly. Said caster wheels are carried by, hence, they move with, said adjustable apparatus when the latter is adjusted.

Between said bosses 110 and 112, said mounting member 79 has a collar 122 extending outwardly from an opening 124 in said extension plate 108, in which collar said eccentric sleeve portion 86 rotatably fits with said wider arcuate portion 83 overlapping a portion of the outside surface of said collar 122. The latter can rotate on said eccentric sleeve portion 86, thus permitting pivotal movement of said adjusting apparatus as said cutting assembly moves over said sheet S. This rotative movement is limited by contact of said mounting member 79 with either said cross bar 16 or cross bar 18, depending upon the direction of movement. Thus a yielding movement of said sliding plate is provided, permitting portions thereof to rise off said sheet S, as when a rough place on the latter is encountered, or if the sheet tends to wrinkle.

Said mounting member 79 has a vacuum box or receptacle portion 126 integral therewith that only partially surrounds said cutter 90, thus leaving an opening into which the particles cut from the surface of said sheet S enter. Said side extension plate 108 extends forwardly from said vacuum box conduit portion 126. A conduit 128 connects with said box portion 126 and extends to a commercial vacuum tank or receptacle 132 into which said particles are drawn as the cutting action takes place.

A sliding plate 134 is attached to said adjustable apparatus mounting member 79 by screws 135, and it is in sliding contact with said sheet S as the carriage travels thereon, keeping said sheet flat on said table 2. It has an opening 136 through which said cutter bristles 92 extend slightly beyond said sliding plate, sufficiently to roughen the surface of said sheet C by cutting into it slightly, the depth of the cut depending upon how far beyond said bristles extend, as, for example, 1/64 inch.

Figure 8:
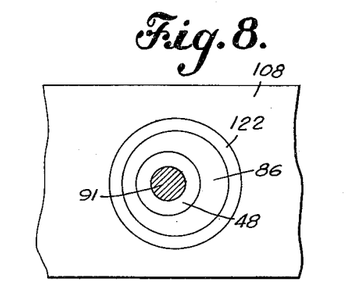
FIG. 8 is a diagrammatic, side elevational view showing the eccentric member of said adjustable apparatus and the cylindrical bearing.

Movement of said adjusting apparatus results in movement of said sliding plate 134 either towards or away from said sheet S. This is effected by a screwing movement of said adjusting screw 70, which rotatably moves said eccentric member 80 on said bearing 48, thus causing, either the thicker, or thinner, part of said sleeve portion 86 to bear against said mounting member collar 122. Movement of the latter changes the distance between said sliding plate 134 and said cutter 90, thereby increasing or reducing the depth of the cut.

In operation, my machine travels on said wheels 8, 8, 8a and 8a that run on said table 2. Said carriage travels above said sheet S, said caster wheels 118 and 120 running on the sheet on said table 2 and with said sliding plate 134 also in contact with the sheet S. Said wire bristles 92 cut away the top, or shiny, surface of said sheet, and the materials so cut away are drawn through said vacuum box portion 126, conduit 128 and into said vacuum tank 132. When the bristles become dull and somewhat shorter, they require grinding, so the adjustable apparatus is moved by actuation of said screw 70, which changes the position of said sliding plate relative to said cutter, as above explained, so the shortened bristles can cut.

When it is desired to raise said cutting assembly 31 slightly, said handle 52 is moved, which rotatively moves said cam member 54 on said top plate 34, to thus lift said sliding plate 134 and cutter 90 away from said sheet S.

What I claim is:

1. A roughening machine comprising a main support, a carriage movably supported by said main support, actuating means supported by said main support and adapted to actuate said carriage, a cutting assembly carried by said carriage embodying a fixed, cylindrical member, a rotatable shaft, a cutter mounted on said shaft and normally adapted to contact the material to be roughened, and adjustable apparatus having a mounting member rotatably mounted on said cylindrical member and embodying a side extension plate, two supporting wheels extending below said side plate and supporting said adjustable apparatus in position of use, means supported by said side plate and extending therefrom in which said wheels are mounted, said adjustable apparatus embodying means movably connected to said side plate to adjust the position of said adjustable apparatus relative to said cutter.

2. A roughening machine comprising a main support, a carriage movably supported by said main support, actuating means supported by said main support and adapted to actuate said carriage, a cutting assembly carried by said carriage embodying a fixed, cylindrical member, a rotatable shaft, a cutter mounted on said shaft and normally adapted to contact the material to be roughened, and adjustable apparatus having a mounting member rotatably mounted on said cylindrical member and embodying a side extension plate having a collar, two supporting wheels extending below said side plate and supporting said adjustable apparatus in position of use, bosses attached to said side plate and extending therefrom in which said wheels are mounted, said adjustable apparatus embodying means movably connected to said side plate collar to adjust the position of said adjustable apparatus relative to said cutter.

3. A roughening machine comprising a main support, a carriage movably supported by said main support, actuating means supported by said main support and adapted to actuate said carriage, a cutting assembly carried by said carriage embodying a fixed, cylindrical member, a rotatable shaft, a cutter mounted on said shaft and normally adapted to contact the material to be roughened, and adjustable apparatus having a mounting member rotatably mounted on said cylindrical member and embodying a side extension plate having a collar, two supporting wheels extending below said side plate and supporting said adjustable apparatus in position of use, means supported by said side plate and extending therefrom in which said wheels are mounted, said adjustable apparatus embodying means movably connected to said side plate collar to adjust the position of said adjustable apparatus relative to said cutter, and a sliding plate attached to and extending below said side plate having an opening therethrough, said cutter extending into said opening.

4. A roughening machine comprising a main support, a carriage movably supported by said main support, actuating means supported by said main support and adapted to actuate said carriage, a cutting assembly carried by said carriage embodying a fixed, cylindrical member, a rotatable shaft, a cutter mounted on said shaft and normally adapted to contact the material to be roughened, and adjustable apparatus having a mounting member rotatably mounted on said cylindrical member and embodying a side extension plate having a collar, two supporting members extending below said side plate and supporting said adjustable apparatus in position of use, means supported by said side plate and extending therefrom in which said supporting members are mounted, said adjustable apparatus embodying means movably connected to said side plate to adjust the position of said adjustable apparatus relative to said cutter, said latter means embodying a sleeve on which said collar is rotatably mounted whereby said adjustable apparatus may rotatably move as said carriage moves.

5. A roughening machine comprising a main support, a carriage movably supported by said main support, actuating means supported by said main support and adapted to actuate said carriage, a cutting assembly carried by said carriage embodying a fixed, cylindrical member, a rotatable shaft, a cutter mounted on said shaft and normally adapted to contact the material to be roughened, and adjustable apparatus having a mounting member embodying a side extension plate having a collar, two supporting wheels extending below said side plate and supporting said adjustable apparatus in position of use, means supported by said side plate and extending therefrom in which said wheels are mounted, a hollow eccentric member rotatably extending into said mounting member collar and rotatably mounted on said fixed cylindrical member, said shaft rotatably extending through said fixed member and said eccentric member, an adjusting member attached to said eccentric member and movably supported by said cutting assembly and adapted upon actuation to move said eccentric member within said collar to adjust the position of said adjustable apparatus relative to said cutter.

6. A roughening machine comprising a main support, a carriage movably supported by said main support, actuating means supported by said main support and adapted to actuate said carriage, a cutting assembly carried by said carriage embodying a screw-threaded bearing, a fixed, cylindrical member, a rotatable shaft, a cutter mounted on said shaft and normally adapted to contact the material to be roughened, and adjustable apparatus having a mounting member embodying a side extension plate having a collar, two supporting wheels extending below said side plate and supporting said adjustable apparatus in position of use, means supported by said side plate and extending therefrom in which said wheels are mounted, a hollow, eccentric member rotatably extending into said mounting member collar and rotatably mounted on said fixed cylindrical member, said shaft rotatably extending through said fixed member and said eccentric member, an adjusting member attached to said eccentric member embodying a screw-threaded portion connected to said screw-threaded bearing and adapted upon actuation to move said eccentric member within said collar to adjust the position of said adjustable apparatus relative to said cutter.

7. A roughening machine comprising a main support, a carriage movably supported by said main support, actuating means supported by said main support and adapted to actuate said carriage, a cutting assembly carried by said carriage embodying a fixed, cylindrical member, a rotatable shaft, a cutter mounted on said shaft and normally adapted to contact the material to be roughened, and adjustable apparatus embodying a mounting member embodying a side extension plate having a collar, two supporting wheels extending below said side plate and supporting said adjustable apparatus in position of use, means supported by said side plate and extending therefrom in which said wheels are mounted, a hollow eccentric member rotatably extending into said mounting member collar and rotatably mounted on said fixed cylindrical member and having a plurality of openings, said shaft rotatably extending through said fixed member and said eccentric member, an adjusting member attached to the latter said eccentric member embodying a finger entering one said opening to thereby move said eccentric member within said collar to adjust the position of said adjustable apparatus relative to said cutter.

8. A roughening machine comprising a main support, a carriage movably supported by said main support, actuating means supported by said main support and adapted to actuate said carriage, a vacuum tank carried by said carriage, a cutting assembly carried by said carriage embodying supporting means, a rotatable shaft, a cutter mounted on said shaft and adapted to contact the material to be roughened, and apparatus supported by said supporting means embodying a traveling mounting member, said traveling mounting member embodying a side plate having an open receptacle portion at an end extremity and adjacent said cutter, and a conduit in communication with said vacuum tank and said receptacle portion whereby particles cut by said cutter may pass to said vacuum tank, said traveling mounting member embodying movable supporting means attached thereto and movably supporting said apparatus during the cutting operation.

9. A roughening machine comprising a main support, a carriage movably supported by said main support, actuating means supported by said main support and adapted to actuate said carriage, a vacuum tank carried by said carriage, a cutting assembly carried by said carriage embodying supporting means, a rotatable shaft, a cutter mounted on said shaft and adapted to contact the material to be roughened, and apparatus supported by said supporting means embodying a traveling mounting member, said traveling mounting member embodying a side plate, an open receptacle portion integral with said side plate and adjacent said cutter and embodying a conduit, and another conduit in communication with said vacuum tank and said receptacle portion conduit whereby particles cut by said cutter may pass to said vacuum tank, said traveling mounting member embodying movable supporting means attached to said side plate and supporting said apparatus during the cutting operation.

10. A roughening machine comprising a main support, a carriage movably supported by said main support, a cutting assembly extending above said main support and pivotally supported by said carriage embodying a rotatable shaft, a cutter mounted on said shaft adapted to contact the material to be roughened, a mounting member fixed to the assembly, a pin attached to said mounting member, a cam member rotatably mounted on said pin and normally in contact with said carriage, a handle connected to said cam member adapted upon actuation to rotatably move said cam member on said carriage to thereby pivot said cutting assembly away from the material so that said cutter is out of contact with said material.

11. A roughening machine comprising a main support embodying a plurality of supporting rods, a carriage movable on and supported by said rods, said carriage embodying a cross bar, a cutting assembly extending above said main support and pivotally supported by said carriage embodying a rotatable shaft, a cutter mounted on said shaft adapted to contact the material to be roughened, a mounting member fixed to the assembly, a pin attached to said mounting member, a cam member normally in contact with said carriage cross bar and rotatably mounted on said pin, a handle connected to said cam member and adapted upon actuation to rotatably move said cam member on said cross bar to thereby pivot said cutting assembly away from the material so that said cutter is out of contact with said material.

References Cited in the file of this patent

UNITED STATES PATENTS

| | | |
|---|---|---|
| 847,651 | Craddock | Mar. 19, 1907 |
| 1,668,255 | Smith | May 1, 1928 |
| 1,750,470 | Hoenes | Mar. 11, 1930 |
| 1,823,774 | Williams | Sept. 15, 1931 |
| 2,179,963 | Spadone | Nov. 14, 1939 |
| 2,342,267 | Goff | Feb. 22, 1940 |
| 2,657,045 | Wilson et al. | Oct. 27, 1953 |
| 2,694,274 | McGibbon | Nov. 16, 1954 |
| 2,739,340 | Blydenburgh et al. | Mar. 27, 1956 |

FOREIGN PATENTS

| | | |
|---|---|---|
| 152,863 | Austria | Mar. 25, 1938 |
| 438,656 | France | May 24, 1912 |